United States Patent Office 3,507,860
Patented Apr. 21, 1970

3,507,860
PROCESS FOR THE PURIFICATION OF CRUDE 7-AMINOCEPHALOSPORANIC ACID AND ACID ADDITION SALTS OF 7-AMINO-CEPHALOSPORANIC ACID EMPLOYED THEREIN
Lewis Aubrey Wetherill, Harrow, William Graham, Pinner, and Michael John Covill, London, England, assignors to Glaxo Laboratories Limited, Greenford, England, a British company
No Drawing. Filed May 24, 1965, Ser. No. 458,446
Claims priority, application Great Britain, May 28, 1964, 22,155/64
Int. Cl. C07d 99/24
U.S. Cl. 260—243                 10 Claims

ABSTRACT OF THE DISCLOSURE

The purification of contaminated 7-aminocephalosporanic acid (7–ACA) by forming a solution of an acid addition salt of 7–ACA or its triloweralkylamine salt, the acid forming the addition salt being a hydrocarbyl sulphonic acid or nitric acid, removing any insoluble impurities from the solution, and crystallising out the acid addition salt. The recovered crystalline acid addition salts are new compounds.

---

This invention is concerned with improvements in or relating to 7-aminocephalosporanic acid and, in particular, with the purification thereof.

7-aminocephalosporanic acid, hereinafter referred to for convenience in the specification and claims as 7–ACA, is recognised to be a very important intermediate in the preparation of biologically active cephalosporin derivatives e.g. 7-phenylacetamidocephalosporanic acid. 7–ACA may be prepared by N-deacylation of the antibiotic cephalosporin C, for example, by means of nitrosyl chloride. The product obtained is frequently contaminated with impurities including, inter alia, unreacted cephalosporin C, with 3-hydroxymethyl analogue and the corresponding lactone together with undefined coloured compounds and it is difficult to remove impurities even on subsequent N-acylation. Thus in addition to forming the desired N-acyl derivative one forms N-acyl derivatives of impurities e.g. of the 3-hydroxymethyl analogue of 7–ACA. It has been found particularly difficult to remove coloured impurities from acyl derivatives of 7–ACA such as 7-phenylacetamido- and 7-thienylacetamidocephalosporanic acids.

We have attempted to purify crude 7–ACA mixtures by forming acid addition salts thereof but find that virtually all acids either appear not to form salts at all or else form water-soluble salts; the latter do not facilitate purification. However, we find that certain sulphonic acids and nitric acid do form salts which are sparingly soluble in water and these salts enable us to obtain not only relatively pure 7–ACA but also relatively pure N-acyl derivatives thereof.

According to the invention, therefore, there is provided a process for the purification of crude 7–ACA (e.g. obtained from the N-deacylation of cephalosporin C) which comprises forming a solution of an acid addition salt of 7–ACA or of an acid addition salt from a base salt of 7–ACA with a hydrocarbyl sulphonic acid or with nitric acid; removing any insoluble impurities from said solution; recovering the acid addition salt from the solution and, if desired, regenerating 7–ACA from the salt.

The crude 7–ACA used in the process according to the invention is preferably obtained by the reaction of cephalosporin C with nitrosyl chloride. However, this is not essential and the process according to the invention may be applied to crude 7–ACA obtained, for example, by enzymatic N-deacylation.

Although the process according to the invention can be applied directly to crude 7–ACA it may be found advantageous first to form a base salt, e.g. with an organic amine, this method having the advantage that some base salts are more soluble in organic solvents and water than 7–ACA itself. Thus 7–ACA, e.g. as a suspension in an inert, water-immiscible organic solvent, can be reacted with a triloweralkylamine to form a solution of the amine salt. The latter may be extracted into water and the aqueous extract reacted with an aqueous solution of the chosen acid. Crystallisation of the acid addition salt can then be effected from the resultant aqueous mixture. Insoluble impurities should be removed when it is convenient to do so and in any event prior to crystallisation of the acid addition salt.

In the case of the hydronitrate one may add aqueous nitric acid to a suspension of 7–ACA in water or a water-soluble organic solvent and agitate the resultant mixture until the 7–ACA goes into solution. 7-amino cephalosporanic acid hydronitrate may be recovered from the solution by cooling after the removal of solid impurities.

On the other hand, when forming acid addition salts of hydrocarbyl sulphonic acids it will not usually be found necessary to form a base salt first. Thus a suspension of 7–ACA in a water-soluble, inert organic solvent may be reacted with a solution or suspension of a hydrocarbyl sulphonic acid in a water-soluble, inert organic solvent, the solvent(s) being chosen so that the resultant acid addition salt is soluble therein. Solid impurities are then removed from the solution. Water may then be added to the solution to induce precipitation of the acid addition salt and the recovery of this may be facilitated by cooling.

The hydrocarbyl sulphonic acid is preferably an alkyl-benzene sulphonic acid wherein the alkyl group(s) may contain from 1 to 18, preferably 1 to 4, carbon atoms. We have obtained good results in the process according to the invention when using p-toluene sulphonic acid. On reaction with 7–ACA this yields 7-aminocephalosporanic acid hydrogen p-toluene sulphonate dihydrate, a substance that is sparingly soluble in aqueous acetone and crystallizes out in high yield and purity.

Other hydrocarbyl sulphonic acids which may be used include lower alkane sulphonic acids, e.g. methane sulphonic acid, and naphthalene sulphonic acids.

Water-immiscible organic solvents which may be used in the process according to this invention include halo-hydrocarbons, i.e. compounds containing halogen, hydrogen and carbon, e.g. methylene chloride, chloroform or 1,2-dichloroethane. Water-soluble organic solvents which may be used in the process according to the invention include water-soluble ketones e.g. acetone, methyl ethyl ketone, etc.

The acid addition salts formed in the process according to the invention are novel and constitute a feature of the invention.

7–ACA may be recovered from the acid addition salt by dissolving the latter in a lower alkanol, e.g. methanol, and adjusting the pH of the solution by means of a base to circa 3.5 (i.e. the isoelectric point of 7-ACA in water) as measured directly on the solution with a glass electrode. The base used to precipitate the 7–ACA is conveniently a concentrated solution of ammonia in a solvent such as methanol or water. An alternative, and in some respects advantageous, method for the recovery of the 7–ACA is to dissolve the acid addition salt in N,N-dimethylacetamide or N,N-dimethylformamide and to pour the resultant solution into water. 7–ACA precipitates in good yield and in a readily filterable form on standing.

The 7–ACA recovered may then be acylated, the 7- acylates obtained being in a high state of purity, provided suitable conditions are chosen for the acylation step.

However, we have surprisingly found that it is not necessary to regenerate 7–ACA from its acid addition salts prior to acylation since the acid addition salts may be directly acylated with an acylating agent e.g. an acid chloride or bromide to yield 7-acylates of high purity, again provided suitable conditions are chosen for the acylation step.

For example, the acid addition salt may be dissolved in an aqueous solution of an acid binding agent, e.g. an alkali metal bicarbonate, and directly acylated with an acid chloride or bromide, e.g. a thienylacetyl chloride. Preferably, however, the salt is acylated according to our copending U.S. application No. 458,383, filed May 24, 1965.

As an alternative to acylation, the acid addition salts may be reacted with nucleophiles to form compounds wherein the acetate group in the 3-acetylmethyl group is replaced by a group derived from the nucleophiles e.g. an azide or a thiobenzoate group.

The term "lower" as used herein indicates that the group in question contains 1–4 carbon atoms.

In order that the invention may be well understood the following examples are given by way of illustration only. In the examples temperatures are in degrees Centigrade.

EXAMPLE 1

(a) Preparation of 7–ACA hydrogen p-toluene sulphonate

Crude 7–ACA (100 g.) was suspended in methylene chloride (500 ml.) and triethylamine (62 ml.) was added as a single charge. The mixture was stirred for 10 minutes and undissolved solid filtered off (ca. 9 g.). The filtrate was extracted with water (2× 200 ml.) and the combined aqueous extracts back-washed with methylene chloride (150 ml.). The resulting aqueous solution was poured into a stirred solution of toluene p-sulphonic acid monohydrate (260 g.) in water (100 ml.). After stirring the clear solution for 30–60 seconds, solid began to crystallise out and the crystallisation was completed by continued stirring for 30 minutes at 0°. The solid was collected by filtration, washed with water (2× 150 ml.) and acetone (150 ml.) and dried at 40° in vacuo to give the purified hydrogen p-toluene sulphonate dihydrate of 7–ACA (116 g., 65.5% of theory).

(b) Regeneration of 7–ACA

The above hydrogen p-toluene sulphonate (116 g.) was stirred in methanol (1.0 l.) and undissolved material (ca. 5 g.) removed by filtration. The filtrate was stirred with charcoal (16.5 g.) at room temperature for 15 minutes. The charcoal was filtered off and washed with methanol (160 ml.). The wash liquor was combined with the filtrate and the total solution stirred while an equal volume of water was added. Precipitation of the solid occurred and the pH was adjusted to 3.5 with strong aqueous ammonia solution. The suspension was stirred for 1 hour with water cooling. The solid was filtered off, washed with water (2× 100 ml.) and acetone (2× 100 ml.) and dried at room temperature in vacuo to give purified 7–ACA (57 g., 57% overall recovery), $[\alpha]_D^{20}$ +92° (c., 1 in pH 6 buffer), $E_{1\,cm.}^{1\%}$ at 264 m$\mu$ = 306 (in pH 6 buffer)

When the material was run on a paper chromatogram using a propanol/water system, no impurity spots were detected, whereas the crude 7–ACA showed the presence of six spots when run under the same conditions.

(c) Regeneration of 7–ACA (alternative method)

7–ACA hydrogen p-toluene sulphonate dihydrate (500 g.) in N,N-dimethylacetamide (2.4 litres) was stirred for 10 minutes with kieselguhr (100 g.). The kieselguhr was filtered off and the filtrate was run directly into water (5 litres). The bed was washed with N,N-dimethylacetamide (150 ml.) and the wash added to the aqueous filtrate. The suspension was aged for ½ hour at room temperature. The solid was collected by filtration and washed with water (2 litres) by displacement. The solid was removed from the funnel and slurried with acetone (1 litre), refiltered and washed with acetone (1 litre) by displacement. The product was dried in vacuo at room temperature to give 7–ACA (239 g., 84.0% recovery, $[\alpha]_D$ +91.7° (c., 1.0 in pH 7 buffer).

EXAMPLE 2

(a) Preparation of 7–ACA hydrogen p-toluene sulphonate dihydrate

With stirring, 7–ACA (0.2 kg.) was suspended in acetone (0.5 litre) at room temperature. A solution of p-toluene sulphonic acid monohydrate (0.24 kg.) in acetone (0.5 litre) was added to the suspension in one charge. Stirring was continued for 5 minutes, the mixture was then clarified by rapid filtration through a kieselguhr bed (0.025 kg.) and the bed washed by displacement with acetone (0.15 litre). The filtrate and wash were mixed and stirred while water (80 ml.) was added as a single charge. Stirring was continued for 4 hours, during which time, after precipitation had begun (15–30 minutes), external ice/salt cooling was applied to the flask. The reaction mixture was filtered, the bed sucked as dry as possible, then washed by slurrying with cold (0°) acetone (0.5 l.) and refiltered. The product was dried at room temperature to give 7–ACA hydrogen p-toluene sulphonate dihydrate (0.26 kg., 73.6% of theory), $[\alpha]_D$ +27° (c., 1 in dimethylacetamide)

$E_{1\,cm.}^{1\%}$ $\lambda$ max. 261–263 m$\mu$ = 156 (methanol)

Paper chromatographic analysis using a propanol/water/sodium acetate buffer system indicated the absence of impurities (Found (percent): C, 42.6; H, 5.07; N, 6.06; S, 13.8. $C_{17}H_{24}N_2O_{10}S_2$ requires (percent): C, 42.5; H, 5.03; N, 5.83; S, 13.4).

(b) Acylation of 7–ACA hydrogen p-toluene sulphonate dihydrate

7–ACA hydrogen p-toluene sulphonate dihydrate (10 g.) was added portionwise to a stirred 7% aqueous sodium bicarbonate solution (100 ml.) and frothing was controlled by adding tetrahydrofuran (60 ml.) as required. A solution of 2-thienylacetyl chloride (3.2 ml.) in tetrahydrofuran (16 ml.) was added by dropping funnel over 10 minutes to the stirred solution and the reaction completed by stirring for a further 10 minutes at room temperature. Ammonium sulphate (40 g.) and petroleum ether (20 ml., B.P. 60–80°) were added, followed by concentrated hydrochloric acid (15 ml.). The mixture was shaken and allowed to separate. The aqueous layer was run off and extracted with a 4:1 mixture of tetrahydrofuran and light petroleum (1× 40 ml., 2× 30 ml.). The organic layers were combined and the resulting solution washed with saturated ammonium sulphate solution (2× 30 ml.) and dried over anhydrous magnesium sulphate. The solid was filtered off, washed with tetrahydrofuran (30 ml.) and the filtrate and washings were concentrated by distillation under reduced pressure to low bulk. The residue in acetone (100 ml.) containing methyl alcohol (10 ml.) was treated with a 12% solution of sodium 2-ethylhexoate in ethyl acetate (33 ml.). After 1 hour at room temperature the solid was harvested by filtration, washed with acetone (35 ml.) and dried in vacuo to give sodium 7-(thienyl-2'-acetamido)cephalosporanate (8.1 g.) representing 93.4% of theory with $[\alpha]_D^{20}$ +132° (c., 1 in water)

$E_{1\,cm.}^{1\%}$ $\lambda$ max. 236–237 m$\mu$ 320, infl. 260 m$\mu$ 200; colour 1.1Y, 0.5R.

A paper chromatogram using 7:3 propanol/water system showed the presence of sodium 7-(thienyl-2'-acetamido)-cephalosporanate as the main product, together with a minor spot with an intensity equivalent to ca. 5% of 7–ACA.

(c) Preparation of 3-azidomethyl-7-aminoceph-3-em-4-oic acid

To a solution of 7–ACA hydrogen p-toluene sulphonate dihydrate (10 g.) in water (100 ml.), sodium azide (2 g.) was added and the pH adjusted to 8 with 2 N-sodium carbonate. The mixture was heated at 50° C. for 17½ hours, cooled and acidified to pH 2 with dilute hydrochloric acid. After cooling, 3-azidomethyl-7-aminoceph-3-em-4-oic acid was filtered off (2.84 g.). This showed strong azide absorption and negligible acetyl absorption in its infrared spectrum.

EXAMPLE 3

Preparation of 7–ACA hydronitrate

With stirring, 7–ACA (2.0 g.) was suspended in water (20 ml.) at room temperature. Nitric acid, S.G. 1.41 (3.0 ml.) was added to the suspension in a single charge and stirring continued until the solid dissolved. The solution was clarified by filtration. The solution was cooled in the refrigerator for 4 hours, during which time crystallisation occurred. The solid was collected by filtration, the bed sucked as dry as possible, then washed by displacement with cold (4° C.) water (2 ml.). The product was dried in vacuo at room temperature to give 7–ACA hydronitrate (0.65 g., 26.4% of theory).

EXAMPLE 4

Preparation of 7–ACA hydronitrate

With stirring, 7–ACA (2.0 g.) was suspended in acetone (30 ml.) at room temperature. A solution of nitric acid, S.G. 1.41 (3.0 ml.) in acetone (10 ml.) was added as a single charge and stirring continued until the solid dissolved. The solution was clarified by filtration and the filtrate cooled in the refrigerator for 4 hours. The solid was collected by filtration, the bed sucked as dry as possible, then washed by displacement with cold (0° C.) acetone (5 ml.). The product was dried in vacuo at room temperature to give 7–ACA hydronitrate (1.75 g., 71.2% of theory), $[\alpha]_D^{20}$ +77.5° (c., 0.5 in pH 6 phosphate buffer) (Found (percent): C, 36.2; H, 4.09; N, 12.3; S, 9.39. $C_{10}H_{13}N_3O_8$ requires (percent): C, 36.1; H, 3.9; N, 12.5; S, 9.56).

EXAMPLE 5

Preparation of 7–ACA hydrogen naphthalene-2-sulphonate

7–ACA (1.0 g.) was added at room temperature to a solution of naphthalene-2-sulphonic acid (1.5 g.) in acetone (5.0 ml.). The mixture was shaken until the solid dissolved, and the solution clarified by filtration through a sintered glass funnel and washed through with acetone (2.0 ml.). Water (0.4 ml.) was added and crystallisation induced by seeding and the mixture cooled in a refrigerator for 3 hours. The precipitated solid was collected by filtration, washed with acetone (5.0 ml.) and dried in vacuo at room temperature to yield 7–ACA hydrogen naphthalene-2-sulphonate (1.2 g.), $[\alpha]_D$ +26.7° (c., 1.0 in dimethylacetamide).

EXAMPLE 6

Preparation of 7–ACA hydrogen methanesulphonate

7–ACA (1.0 g.) was added at room temperature to a solution of methane sulphonic acid (0.5 ml.) in acetone (2.0 ml.) and dissolved by stirring for 5 minutes. The solution was clarified by filtration through a sintered glass funnel and washed through with acetone (1.0 ml.). Water (0.4 ml.) was added, crystallisation induced by seeding and the mixture cooled in a refrigerator for 3 hours. The solid was collected by filtration, washed with acetone (5.0 ml.) and dried in vacuo at room temperature to give 7–ACA hydrogen methanesulphonate (1.0 g.), $[\alpha]_D$ +32.4° (c., 1.0 in dimethylacetamide).

EXAMPLE 7

Preparation of 7–ACA hydrogen p-toluene sulphonate dihydrate

7–ACA (10.0 g.; passed through 60 mesh sieve) was suspended in methyl ethyl ketone (25 ml.) and added to a suspension of p-toluene sulphonic acid monohydrate (12.0 g.) in the same solvent (25 ml.). The mixture was stirred for 5 minutes and the solution clarified by filtration through a kieselguhr bed. Water (4 ml.) was added and the precipitation that started immediately was completed by keeping at 0° for 2 hours. The solid was collected by filtration, washed with acetone (30 ml.) by slurry and dried in vacuo at room temperature to give 7–ACA hydrogen p-toluene sulphonate dihydrate (14.49 g., 82.1% of theory), $[\alpha]_D$ +28.2° (c., 1.0 in dimethylacetamide)

λ max. at 262 mμ, $E_{1\,cm.}^{1\%}$ 148

We claim:

1. 7-aminocephalosporanic acid hydrogen p-toluene sulphonate dihydrate.
2. 7-aminocephalosporanic acid hydrogen naphthalene-2'-sulphonate.
3. 7-aminocephalosporanic acid hydrogen methane-sulphonate.
4. A process for the purification of 7–ACA contaminated with impurities, comprising forming a solution of an acid addition salt selected from the group consisting of an acid addition salt of said 7–ACA and an acid addition salt of a triloweralkylamine salt of said 7–ACA, the acid forming said acid addition salt being selected from the group consisting of an alkylbenzene sulphonic acid in which the alkyl radical is of 1 to 18 carbon atoms, a lower alkane sulphonic acid, naphthalene sulphonic acid and nitric acid; removing any insoluble impurities from said solution; and crystallising out the acid addition salt of said 7–ACA, said impurities being such that they do not form a crystallisable acid addition salt with said acid or interfere with the formation of said acid addition salt of 7–ACA or its triloweralkylamine salt.
5. A process as defined in claim 4 wherein 7–ACA is regenerated from the acid addition salt which is crystallised out.
6. A process for the purification of 7–ACA contaminated with impurities, comprising forming a suspension of said 7–ACA and impurities in a water-immiscible organic solvent; adding a triloweralkylamine to the suspension to form a solution of an amine salt of said 7–ACA in said solvent; extracting said salt into water; adding to the aqueous extract an acid selected from the group consisting of an alkylbenzene sulphonic acid in which the alkyl radical is of 1 to 18 carbon atoms, a lower alkane sulphonic acid, naphthalene sulphonic acid and nitric acid and crystallising out the resultant acid addition salt, said impurities being such that they do not form a crystallisable acid addition salt with said acid or interfere with the formation of said acid addition salt of said triloweralkylamine salt of 7–ACA.
7. A process for the purification of 7–ACA contaminated with impurities, comprising forming a suspension of said 7–ACA and impurities in a water-soluble, inert organic solvent; adding to the suspension a solution in a water-soluble inert organic solvent of an acid selected from the group consisting of an alkylbenzene sulphonic acid in which the alkyl radical is of 1 to 18 carbon atoms, a lower alkane sulphonic acid and naphthalene sulphonic acid to form a solution of an acid addition salt of said 7–ACA; removing any insoluble impurities from said solution and crystallising out said acid addition salt of said 7–ACA, said impurities being such that they do not form a crystallisable acid addition salt with said acid or interfere with the formation of said acid addition salt of 7–ACA.
8. A process as defined in claim 7 wherein 7–ACA is regenerated from the acid addition salt which is crystallised out by dissolving said acid addition salt in a lower alkanol, and adjusting the pH of the solution by means of a concentrated solution of ammonia to about 3.5 as measured directly on the solution with a glass electrode to precipitate 7–ACA.

9. A process for the purification of 7–ACA contaminated with impurities, comprising contacting said 7–ACA with p-toluene sulphonic acid in acetone to form a solution of the resultant acid addition salt; removing any insoluble impurities from the solution; adding water to the solution and crystallising out 7–ACA hydrogen p-toluene sulphonate dihydrate therefrom, said impurities being such that they do not form a crystallisable acid addition salt with said acid or interfere with the formation of said acid addition salt of 7–ACA.

10. A process as defined in claim 4 wherein said acid addition salt is 7–ACA hydrogen p-toluene sulphonate and a solution or suspension of said acid addition salt is reacted with 2-thienylacetyl chloride to produce 7-(thienyl-2'-acetamido) cephalosporanic acid.

References Cited
UNITED STATES PATENTS 3,216,999 11/1965 Flynn.
3,207,755 9/1965 Abraham et al.

NICHOLAS S. RIZZO, Primary Examiner